Dec. 21, 1954 — C. N. PETERSON — 2,697,415
AUTOMATIC ANIMAL DUSTER AND BACK SCRATCHER
Filed Aug. 25, 1953 — 2 Sheets-Sheet 1

INVENTOR.
Clarence N. Peterson
BY Victor J. Evans & Co.
ATTORNEYS

Dec. 21, 1954      C. N. PETERSON      2,697,415
AUTOMATIC ANIMAL DUSTER AND BACK SCRATCHER
Filed Aug. 25, 1953      2 Sheets-Sheet 2
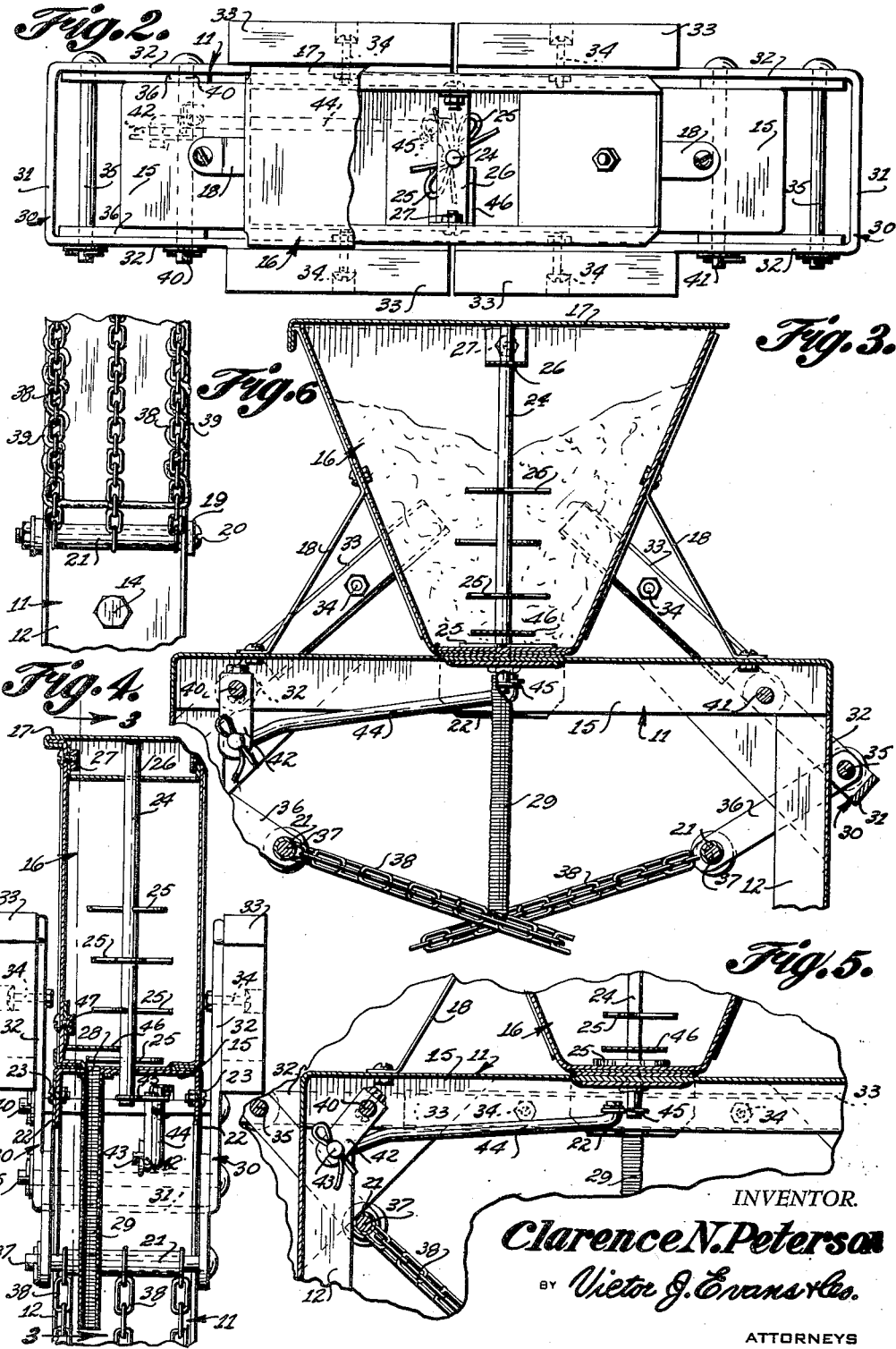
INVENTOR.
Clarence N. Peterson
BY Victor J. Evans & Co.
ATTORNEYS

United States Patent Office 2,697,415
Patented Dec. 21, 1954

2,697,415

AUTOMATIC ANIMAL DUSTER AND BACK SCRATCHER

Clarence N. Peterson, Grand Island, Nebr.

Application August 25, 1953, Serial No. 376,309

2 Claims. (Cl. 119—159)

This invention relates to an agricultural implement, and more particularly to a cattle duster.

The object of the invention is to provide a device which is adapted to have cattle pass therethrough whereby an insecticide will be automatically dispensed onto the cattle to disinfect the cattle and thereby kill lice, fleas, and the like on the cattle.

This invention is an improvement over the cattle grub remover and insecticide applicator of my Patent No. 2,632,063.

Another object of the invention is to provide a device which can be used for all types of livestock, cattle, hogs, sheep and other animals whereby such parasites as mites, lice, grubs, and flies can be controlled and killed so that the necessity of treating the cattle by hand will be eliminated.

A further object of the invention is to provide a cattle duster which will effectively dust the heads, backs and sides of the cattle, and wherein the insecticide powder will be distributed over the entire animal so that the cattle can be raised more efficiently.

A further object of the invention is to provide a cattle duster which is extremely simple and inexpensive to manufacture.

Other objects and advantages will be apparent during the course of the following description.

In the accompanying drawings, forming a part of this application, and in which like numerals are used to designate like parts throughout the same:

Figure 2 is a top plan view of the cattle duster, with parts broken away and in section.

Figure 3 is a front elevational view of the cattle duster, with parts broken away and in section, and taken on the line 3—3 of Figure 4.

Figure 4 is a sectional view taken on the line 4—4 of Figure 1.

Figure 5 is a fragmentary elevational view showing the parts in a different position from that shown in Figure 3.

Figure 6 is a sectional view taken on the line 6—6 of Figure 1.

Figure 1:
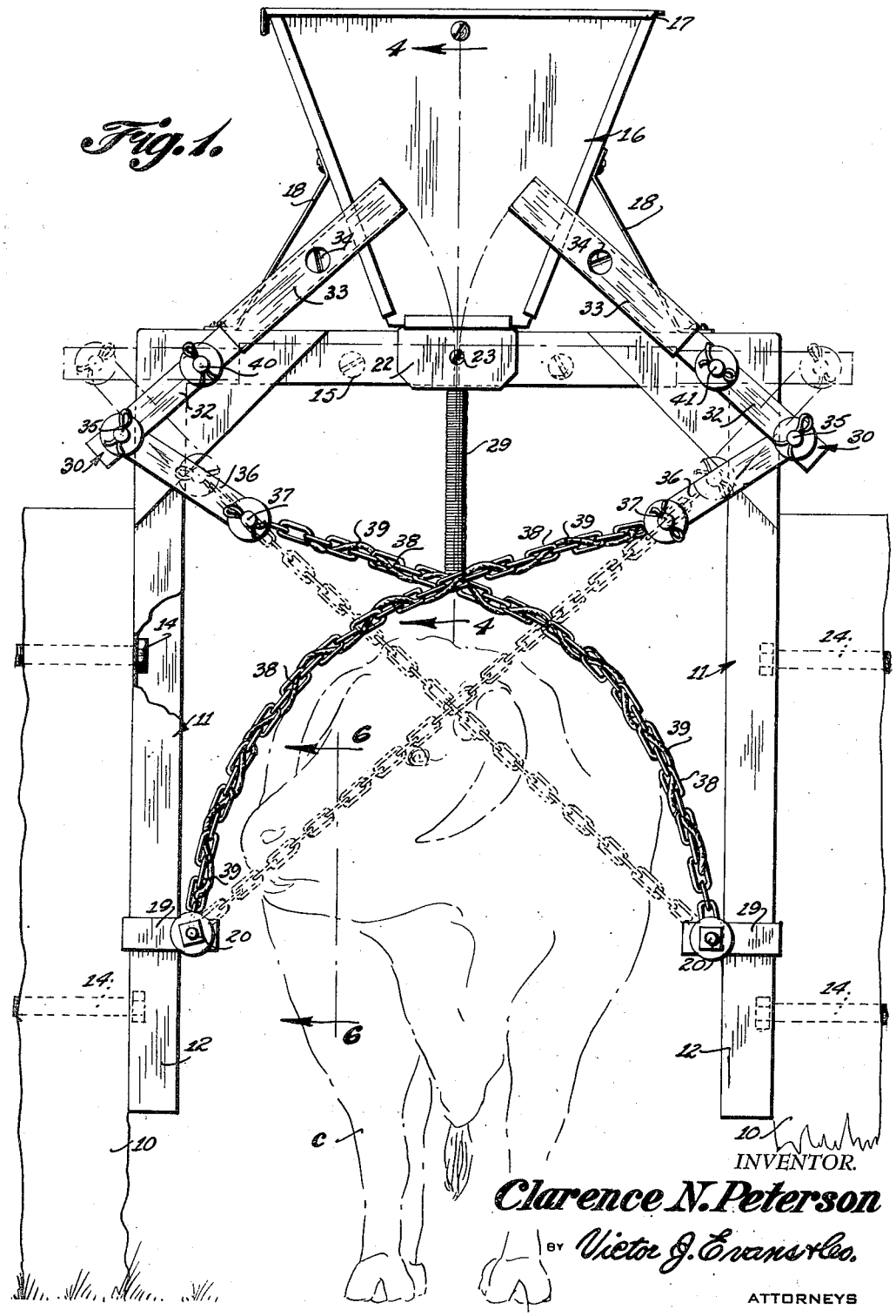
Figure 1 is a front elevational view of the cattle duster, constructed according to the present invention.

Referring in detail to the drawings, the numeral 10 designates each of a pair of vertically disposed posts which may be driven into the ground and the cattle to be disinfected are indicated by the letter C, the cattle C adapted to pass through the pair of posts 10. The numeral 11 designates a frame which includes a pair of vertically disposed legs 12 that are secured to the posts 10 in any suitable manner as for example by bolt and nut assemblies 14. There are a pair of the legs 12, and extending between the upper ends of the legs 12 and secured thereto is a crossbar 15, Figure 1.

Mounted on the crossbar 15 and secured thereto is a hopper 16 which is adapted to hold a quantity of disinfectant powder therein. A lid 17 may be mounted on the upper end of the hopper 16, and suitable braces 18 may extend between the hopper 16 and the crossbar 15 for maintaining the hopper in place. Connected to each of the legs 12 of the frame 11 is a bracket 19 which may have a U-shape, and a bolt and nut assembly 20 is carried by each of the brackets 19. A sleeve 21 is mounted on each of the bolt and nut assemblies 20, Figure 6, for a purpose to be later described. Plates 22 may be secured to the crossbar 15 by suitable bolt and nut assemblies 23, and the plates 22 may be additionally secured to the hopper 16 for helping to anchor the hopper 16. An agitator rod 24 is rotatably mounted in the hopper 16, and the rod 24 has a plurality of cotter pins or agitator fingers 25 extending therefrom. The rod 24 may be rotatably mounted in a bearing member 26 which is secured to the hopper 16 by bolt and nut assemblies 27, Figure 4. Thus, as the rod 24 rotates the fingers 25 will agitate the powdered insecticide to thereby insure that the insecticide is efficiently dispensed onto the cattle C.

The bottom of the hopper 16 and the bar 15 are provided with registering openings 28 through which the powder from the hopper 16 is adapted to be dispensed or discharged. A spring member 29 which is hollow for the passage therethrough of the disinfectant powder, depends from the bar 15 and has its upper end registering with the outlet openings 28 so that the disinfectant powder from the hopper 16 will pass through the openings 28, then through the inside of the spring member 29 and onto the backs of the cattle C as the cattle C pass between the legs 12 as later described in this application. The spring member 29 in its open position permits the disinfectant powder to pass therethrough onto the hide of the animal.

The present invention further includes a pair of U-shaped yokes 30 which are pivotally mounted on the upper ends of the frame 11, each of the yokes 30 includes a web 31 and a pair of spaced parallel legs 32. A counterweight 33 is secured to each of the legs 32 by a suitable bolt and nut assembly 34, and carried by each of the yokes 30 is a shaft or pin 35. A pair of spaced parallel links 36 each have an end pivotally mounted on the shaft 35, and a pin 37 extends between the other ends of each pair of links 36, Figure 1. A plurality of chains 38 extend between the pin 37 and the sleeves 21 and it will be seen that the chains 38 are arranged in criss-cross relation with respect to each other. The chains 38 may have a suitable cable or rope 39 trained therethrough.

A shaft or pin 40 is secured to the yoke 30 shown in the upper left corner of Figure 1, so that as the yoke 30 pivots about an axis extending through the shaft 40, the shaft 40 will turn therewith. The other yoke 30 is rotatably mounted on a shaft or pin 41 and which extends through the bar 15. An ear or lug 42 is secured to the movable shaft 40, and a pin 43 secures the ear 42 to an arm 44. The other end of the arm 44 has a cotter pin or connecting member 45 for connecting the arm 44 to the lower end of the agitator rod 24. Thus, as the shaft 40 is rotated by its yoke 30, the arm 44 will be moved back and forth to thereby rotate the rod 24 and cause the agitator fingers 25 to break up any lumps that may occur in the powdered insecticide or disinfectant within the hopper 16 so that the material will be smoothly discharged through the openings 28 and through the tube 29. A plate member 46 may be secured within the hopper 16 by a suitable bolt and nut assembly 47, Figure 4, and the plate member 46 serves to control the discharge of disinfectant powder through the spring member 29.

From the foregoing it is apparent that a device has been provided which will efficiently dust cattle or livestock with disinfectant powder or insecticide whereby various parasites on the cattle will be killed or eliminated. In use the cattle C pass between the legs 12 and as the cattle pass between the legs they engage the chains 38 to move the chains 38 from their positions shown in dotted lines in Figure 1 to the position shown in solid lines in Figure 1. This causes the pair of yokes 30 to pivot about the shafts 40 and 41 and also the shaft 40 will be rotated since it is secured to its yoke 30. As the shaft 40 rotates it reciprocates the arm 44 which in turn rotates the rod 24 so that the agitator fingers 25 shake loose some of the disinfectant powder from the hopper 16 whereby this powder passes down through the openings 28 and then through the tube 29 onto the cattle. The hopper 16 can be replenished or filled with disinfectant powder when it becomes empty and the counterweights 33 cause the parts to move back in the position shown in dotted lines in Figure 1 when the cattle C is not in position between the legs 12 to actuate the device.

The present invention can be used as a duster for all types of livestock, cattle, hogs and sheep and when the dust from the hopper 16 is put on the cattle C the grubs will be killed or whatever kind of parasites on the animal, such parasites will be killed by the disinfectant. The chains 38 and ropes 39 help to automatically massage the powder into the hair upon the hides of the cattle, and these chains or ropes also help to remove the heads of cattle grubs whereby the powder will act to kill the same. The present invention can be used in the coldest of weather when oils and sprays are not practical so that the work of treating cattle by hand is eliminated and also the cattle do not have to be corralled to be sprayed which always means a shrinkage of several pounds from excitement, handling and scouring. The cross chains 38 will provide more scratching coverage over the head, back and sides of the cattle than any previous duster or back scratcher that has been devised. While the cattle are scratching themselves in the duster, the powder is distributed over the animal, the powder being rubbed in next to the skin where it is effective for a long period of time to kill the nits and eggs as they hatch. Also, if desired the powder supply may be shut off and the duster used merely as a scratcher which is especially advantageous for removing old hair in the spring to give the cattle a nice looking finish. Also, the present invention is sturdily built so that it will be trouble free in use.

I claim:

1. An animal duster comprising a pair of spaced parallel vertically disposed posts, a frame including a pair of spaced parallel vertically disposed legs secured to said posts, a bar extending between the upper ends of said legs and secured thereto, a hopper for holding powdered disinfectant mounted on said bar intermediate the ends thereof, there being registering openings in said hopper and bar, a spring member depending from said bar for the passage therethrough of material from said hopper, a vertically disposed rod rotatably extending through said hopper, a plurality of horizontally disposed agitator fingers extending transversely from said rod, a bracket connected to each of said legs, a pair of U-shaped yokes pivotally connected to the upper end of said frame, links pivotally connected to each of said yokes, a plurality of criss-cross chains extending between said links and brackets, counterweights connected to each of said yokes, and means connecting one of said yokes to said rod.

2. An animal duster comprising a pair of spaced parallel vertically disposed posts, a frame including a pair of spaced parallel vertically disposed legs secured to said posts, a bar extending between the upper ends of said legs and secured thereto, a hopper for holding powdered disinfectant mounted on said bar intermediate the ends thereof, there being registering openings in said hopper and bar, a spring member depending from said bar for the passage therethrough of material from said hopper, a vertically disposed rod rotatably extending through said hopper, a plurality of horizontally disposed agitator fingers extending transversely from said rod, a bracket connected to each of said legs, a pair of U-shaped yokes pivotally connected to the upper end of said frame, links pivotally connected to each of said yokes, a plurality of criss-cross chains extending between said links and brackets, counterweights connected to each of said yokes, means connecting one of said yokes to said rod, said means comprising a shaft connected to said last named yoke and pivotally mounted in said frame, an arm having one end connected to said rod, and an ear connecting the other end of said arm to said shaft.

References Cited in the file of this patent

UNITED STATES PATENTS

| Number | Name | Date |
| --- | --- | --- |
| 1,223,199 | Patterson | Apr. 17, 1917 |
| 1,577,938 | Stanton | Mar. 23, 1926 |
| 1,810,228 | Snyder | June 16, 1931 |
| 2,380,842 | Heese | July 31, 1945 |
| 2,632,063 | Peterson | Mar. 17, 1953 |
| 2,667,859 | Murray et al. | Feb. 2, 1954 |